(12) United States Patent
Tyni et al.

(10) Patent No.: US 6,913,117 B2
(45) Date of Patent: *Jul. 5, 2005

(54) METHOD AND APPARATUS FOR ALLOCATING PASSENGERS BY A GENETIC ALGORITHM

(75) Inventors: Tapio Tyni, Hyvinkää (FI); Jari Ylinen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 241 days.

This patent is subject to a terminal disclaimer.

(21) Appl. No.: 10/232,366

(22) Filed: Sep. 3, 2002

(65) Prior Publication Data

US 2004/0040791 A1 Mar. 4, 2004

Related U.S. Application Data

(63) Continuation of application No. PCT/FI01/00220, filed on Mar. 5, 2001.

(30) Foreign Application Priority Data

Mar. 3, 2000 (FI) .............................................. 20000502

(51) Int. Cl.⁷ ................................................. B66B 1/18
(52) U.S. Cl. ........................ 187/382; 187/902; 706/910
(58) Field of Search ................................. 187/380, 382, 187/902, 247; 706/13, 21, 902, 903, 910

(56) References Cited

U.S. PATENT DOCUMENTS

| | | | | |
|---|---|---|---|---|
| 4,935,877 A | * | 6/1990 | Koza | 706/13 |
| 5,767,461 A | * | 6/1998 | Nakagawa et al. | 187/382 |
| 5,848,403 A | * | 12/1998 | Gabriner et al. | 706/13 |
| 5,907,137 A | * | 5/1999 | Tyni et al. | 187/382 |
| 5,932,852 A | * | 8/1999 | Tyni et al. | 187/382 |
| 6,000,504 A | * | 12/1999 | Koh et al. | 187/382 |
| 6,293,368 B1 | * | 9/2001 | Ylinen et al. | 187/382 |
| 6,508,333 B2 | * | 1/2003 | Kostka et al. | 187/382 |

FOREIGN PATENT DOCUMENTS

| | | |
|---|---|---|
| EP | 0897891 A | 2/1999 |
| EP | 9933741 A | 7/1999 |

* cited by examiner

*Primary Examiner*—Jonathan Salata
(74) *Attorney, Agent, or Firm*—Birch, Stewart, Kolasch & Birch, LLP

(57) ABSTRACT

The invention relates to a method for allocating landing calls issued by passengers, in which method each passenger gives his/her destination floor via a call device. According to the invention, the call is allocated to an elevator car to serve the passenger via genetic allocation, wherein the floors of departure and destination of the passenger are recorded in alternative chromosomes, the required data regarding the passenger and elevator car being recorded in a gene in the chromosome, that, utilizing genetic methods, the best chromosome is selected, and that the passenger is directed into the elevator car selected, and that the selected elevator car is directed to serve the passenger in question.

11 Claims, 3 Drawing Sheets

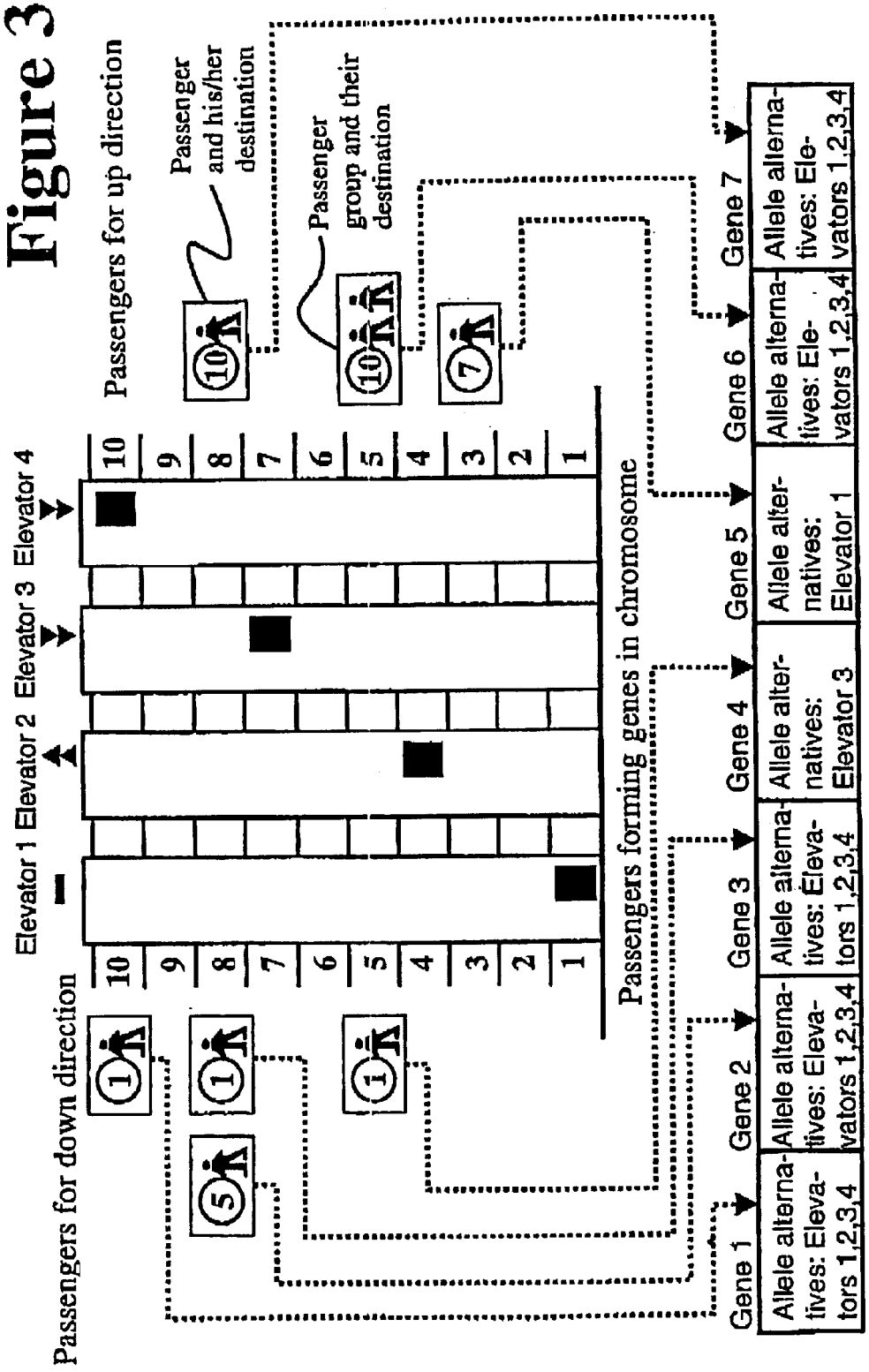

METHOD AND APPARATUS FOR ALLOCATING PASSENGERS BY A GENETIC ALGORITHM

This application is a Continuation of copending PCT International Application No. PCT/FI01/00220 filed on Mar. 5, 2001, which was published in English and which designated the United States and on which priority is claimed under 35 U.S.C. § 120, the entire contents of which are hereby incorporated by reference.

FIELD OF THE INVENTION

The present invention relates to a method and apparatus for allocating passengers in an elevator group, and more particularly, to a method and apparatus using genetic algorithms for the allocation of passengers to elevator cars.

BACKGROUND OF THE RELATED ART

When a passenger wishes to have a ride on an elevator, he/she will issue a call for an elevator by pressing a landing call button mounted at the floor. The control system of the elevator group receives the call for an elevator and tries to figure out which one of the elevators in the elevator group will be best able to serve the call. The activity is termed call allocation. The problem to be solved by allocation is how to find an elevators that will minimize a given cost factor. Allocation may aim at minimizing passengers, waiting time, passengers' traveling time, the number of times the elevator will atop or a combination of several cost factors weighted in different ways.

Traditionally, to establish which one of the elevators would be appropriate to serve a call, the reasoning is carried out individually for each case using complicated conditional structures. The final aim of this reasoning is to minimize a cost factor describing the operation of the elevator group, typically e.g. the call time or the average waiting time of the passengers. As the elevator group works in a complicated state space, the conditional structures are also complicated and they tend to have gaps, there appear situations in which the control is not functioning in an optimal way. Likewise, it is difficult to take the elevator group into consideration as a whole. A typical example of this is the traditional collective control, in which a landing call is served by the one of the elevators which is traveling in the direction toward the call at the closest distance from the calling floor. This simple optimization principle, however, leads to aggregation of the elevators, which means that the elevators are traveling in a front in the same direction, and therefore to a fall in the performance of the elevator group as a whole.

SUMMARY OF THE INVENTION

The object of the invention is to achieve a new method and apparatus for the allocation of passengers by a genetic algorithm. The method of the invention is characterized by the characterization part of claim 1. The apparatus of the invention is characterized by the characterization part of claim 8.

Instead of allocation of landing calls, the solution of the invention concerns the allocation of passengers. Since in passenger allocation each passenger indicates his/her target floor and since the floor of departure is known on the basis of the location of the call input device, the passengers' intentions regarding the system are known unambiguously. Using this perfect basic data, the control system of the elevator group can try to find an elevator advantageous to the passenger, in other words, allocate passengers to elevator cars. In traditional allocation of up/down calls, the data obtained about passengers is imperfect and therefore, instead of passengers, calls are allocated, in other words, the system tries to find an advantageous elevator for the call.

The decision-making is based on genetic algorithms. At first, a set of alternative solutions, i.e. chromosomes are created, and the quality of these as an allocation decision is determined. Next, the set of alternative solutions is refined by genetic methods, including selection of representative solution alternatives for the next generation and as parents to descendants, generation of descendants, i.e. new solution alternatives, by cross-breeding the best solution alternatives with each other and/or by applying mutations, i.e. changes in the genes of descendants. For each descendant, it is necessary to determine a quality factor, whereupon it is possible to generate the next generation of solution alternatives or, it a termination criterion is fulfilled, the best alternative among the set of solutions is output as a solution to the problem. Genetic passenger allocation differs from earlier genetic methods above all in that, instead of traditional up/down calls, allocation is expressly concerned with passengers, i.e. deciding which elevator car is to serve each passenger, whereas in earlier methods the allocation decision determines which elevator car is to serve each landing call. This is possible because each passenger gives his/her destination floor via a signaling device while on the floor of departure, so that the data for each individual passenger are known in the elevator system. The elevator system must also inform each passenger as to the elevator to serve him/her. Once the passenger has been given this information, the elevator car suggested for him/her generally should not be subsequently changed.

One of the advantages of the solution of the invention is that the accurate information provided by passenger allocation and the method presented make it possible to improve the level of service offered to passengers. The system is also able to produce traffic statistics containing, among other things, passenger information and passengers' movements in the building, and to produce parameters describing passenger service, such as e.g. passenger waiting ties, during normal operation.

BRIEF DESCRIPTION OF THE DRAWINGS

In the following, the invention will be described in detail by the aid of one of its embodiments with reference to the drawings, wherein FIG. 3 presents an example representing the coding of passengers to form chromosomes.

DETAILED DESCRIPTION OF THE PREFERRED EMBODIMENTS

Figure 1:
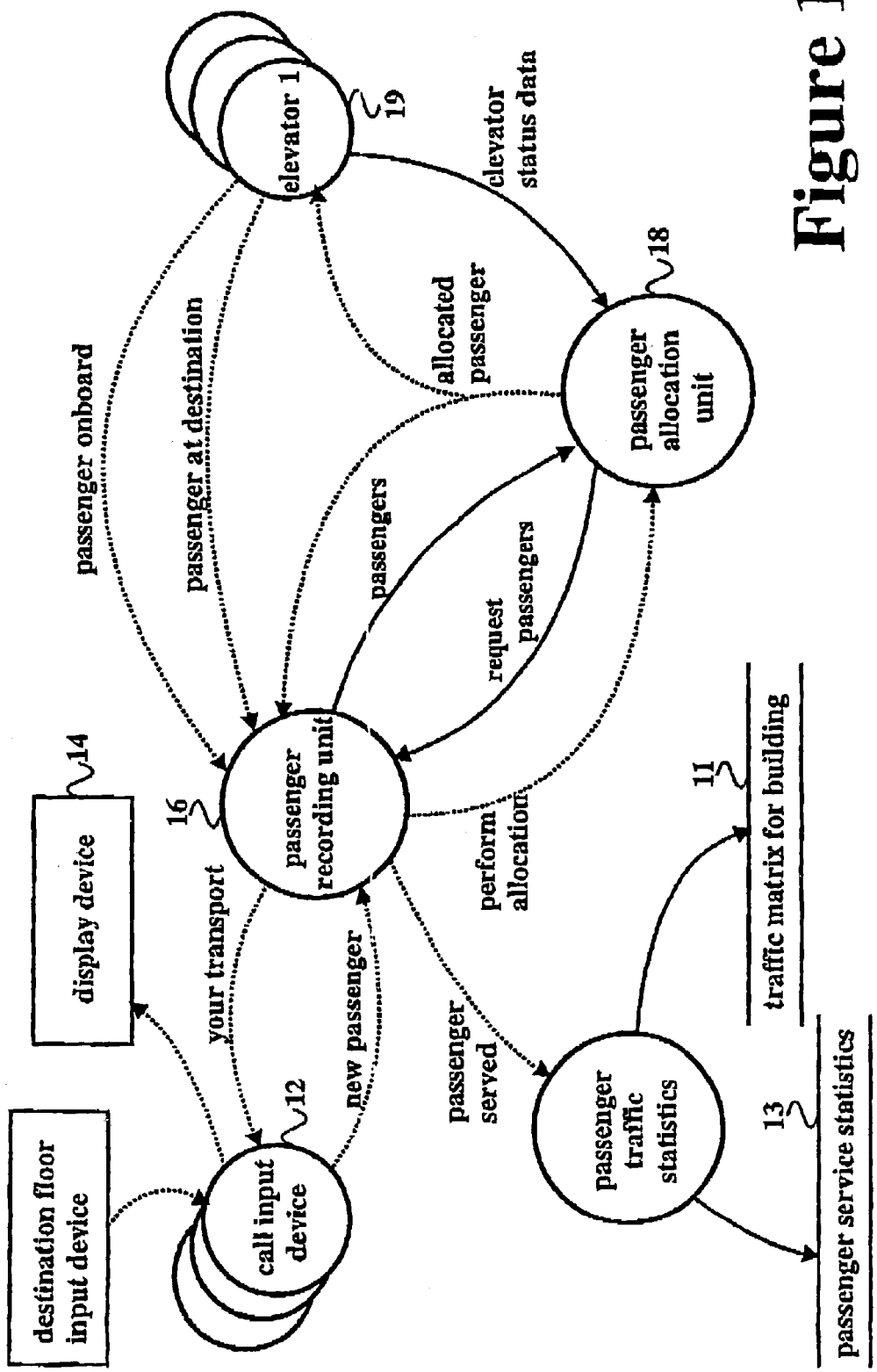
FIG. 1 illustrates the architecture of the system, showing the equipment comprised in the system.

FIG. 1 illustrates the architecture of the system. When a passenger wishes to call an elevator, he/she indicates the desired destination floor via a call input device on his/her floor of departure. The call input device tells the passenger which elevator is going to serve him/her. In the following, the operation of the system will be described step by step. When the passenger indicates his/her destination floor via the call input device 12, the call input device generates from it a "new passenger" message, which is transmitted to the control system of the elevator group. The message contains the following data:

Device identification+floor of departure+entry side+destination floor+exit side

The message is processed in a passenger recording unit 16, which keeps records of passengers and passenger data. The recording unit includes in the arriving information an unambiguous passenger identifier, time and elevator data, and stores these data (bold text);

passenger identifier+floor of departure+entry side+destination floor+exit side+time of arrival of passenger at floor of departure+time of passenger's entrance into car+time of arrival of passenger at destination floor+elevator+car+estimated time of arrival of elevator cat at floor of departure At this stage, the fields given in normal text have not yet been defined. Having saved the data, the passenger recording unit 16 starts a passenger allocation procedure by sending the message "perform allocation". The passenger allocation unit 18 asks the passenger recording unit 16 to give all passengers in the system together with the passenger data. Next, it starts a search to find an elevator car for each passenger not yet allocated. An unallocated passenger is a passenger for whom no elevator car has been assigned. Once the passenger allocation unit has decided which elevator car is to serve each unallocated passenger, it will send an "allocated passenger" message for each passenger to the passenger recording unit 16. The message contains information indicating the elevator car to serve the passenger:

passenger identifier+elevator+car+estimated time of arrival of elevator car at floor of departure The passenger recording unit 16 updates the data regarding the elevator car reserved for serving the passenger in question. Thus, at this stage, the following facts concerning the passenger, given in bold text, are known:

passenger identifier+floor of departure+entry side+destination floor+exit side+time of arrival of passenger at floor of departure+time of passenger's entrance into car+time of arrival of passenger at destination floor+elevator+car+estimated time of arrival of elevator car at floor of departure The passenger recording unit 16 sends the call input device 12 a "Your transport" message, which tells the passenger via a display device 14 the elevator car to serve him/her and possibly an estimated time of arrival of the elevator:

device identifier+passenger identifier+floor of departure+entry side+destination floor+exit side+elevator+car+estimated time of arrival of elevator car at floor of departure Data indicating which elevator car is going to serve the passenger is also transmitted to the elevator 19 having the car in question.

The elevator 19 keeps, its own books about passengers. The elevator has two lists for passengers. One of the lists contains the passengers who are going to enter the car, and the other list contains the passengers currently in the car. A new allocated passenger is first added to the list of passengers waiting to enter the car. At the same time, the passenger's floor of departure is registered as a stopping floor along the route of the elevator. When the elevator stops at a floor, it goes through its two passenger lists. The passenger is transferred from the list of passengers wanting to enter the car to the list of passengers currently in the car if (a) the floor at which the elevator has stopped is the same as the passenger's floor of departure and (b) the elevator is able to continue in the direction toward the passenger's destination floor. In this case, the elevator 19 will send a "passenger onboard" message:

Passenger identifier+time of entrance+of passenger to car

At the same time, the elevator sets the destination floor of the passengers having just entered the car as a future stopping floor in its service sequence.

The passenger recording unit updates the passenger's time of entrance into car with the data of the "passenger onboard" message. The facts known about the passenger are now as follows (bold text):

passenger identifier+floor of departure+entry side+destination floor+exit side+time of arrival of passenger at floor of departure+time of passenger's entrance into car+time of arrival of passenger at destination floor+elevator+car+time of arrival of elevator car at floor of departure The destination floors of passengers are treated in a similar way. When the elevator stops at a floor, it checks its list of passengers onboard the car. The passenger is removed from this list if the stopping floor is the same as the passenger's destination floor. The passenger has now reached his/her destination and the elevator sends a "passenger at destination" message:

passenger identifier+passenger's time of arrival at destination floor

The passenger recording unit updates the passenger's time of arrival at destination floor with the data of the "passenger at destination" message. Finally, the passenger recording unit removes the passenger from its own lists and sends information regarding the passenger to a unit collecting statistics in a "passenger served" message, which thus contains complete updated passenger data:

passenger identifier+floor of departure+entry side+destination floor+exit side+time of arrival of passenger at floors of departure+time of passenger's entrance into car+time of arrival of passenger at destination floor+elevator+car+time of arrival of elevator car at floor of departure Based on this information regarding individual passengers, it is possible to generate building-specific traffic statistics 11 to describe passenger traffic between different floors typically by the time of the day. This is difficult in a traditional system, where it is only possible to estimate the traffic components arriving at and departing from a floor from/in the up and down directions but not the traffic between floors with any accuracy. Likewise, the passenger data can be used to produce exact basic characteristics 13 describing the quality of service of the elevator group, typically by the time: passenger's waiting time, riding time and traveling time. In traditional control systems, these data, too, are inaccurate.

Figure 2:
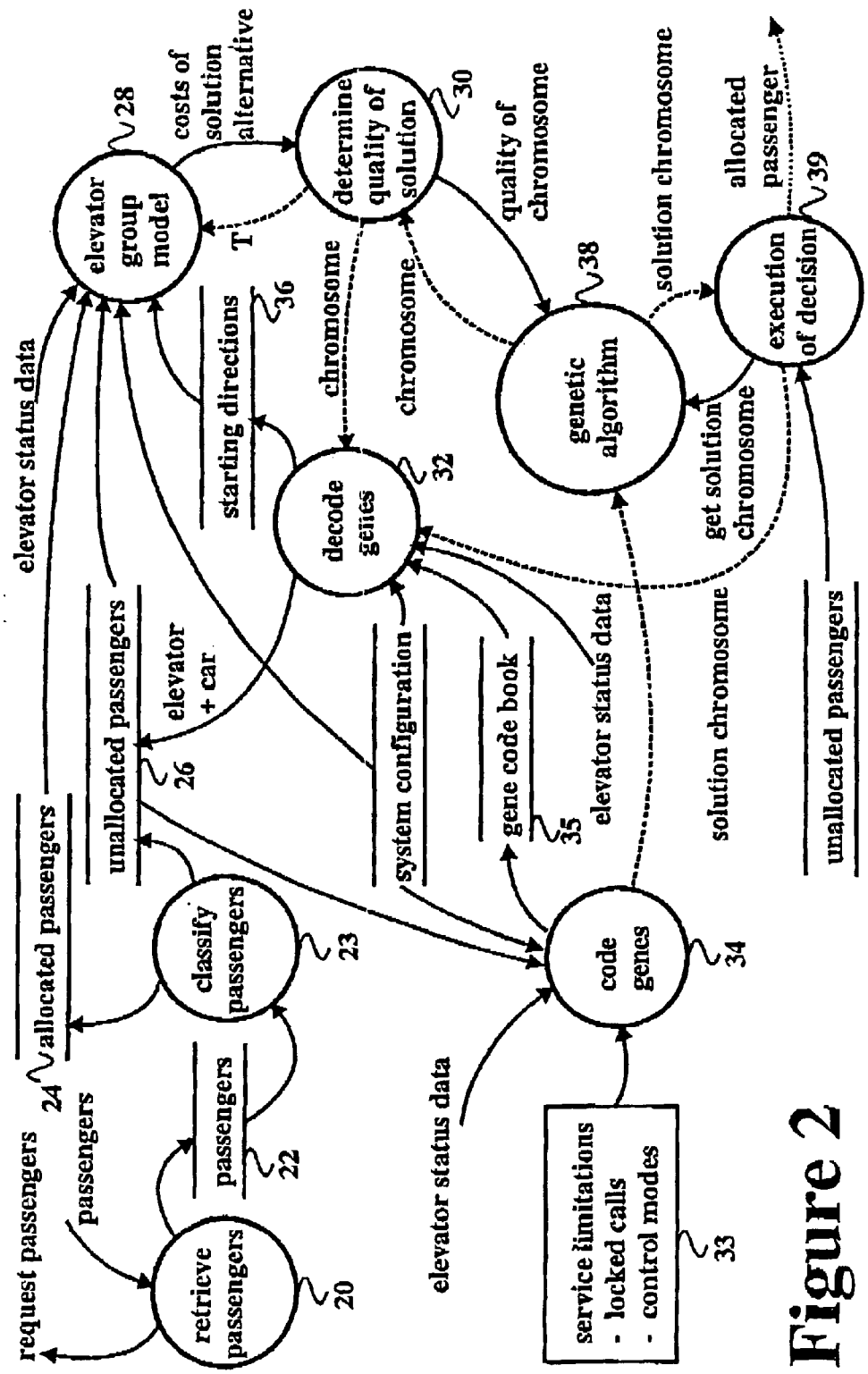
FIG. 2 illustrates the operation of passenger allocation.

FIG. 2 illustrates the action of the passenger allocation system. First, the data for all passengers are read 20 into a specific local data storage 22. Next, the passengers are grouped 23 into allocated 24 and unallocated 26 passengers. For the allocated passengers, an elevator car has already been reserved, in other words, the system knows which elevator car is going to serve each passenger, whereas for the unallocated passengers, no elevator car has not yet been reserved, Both types or passenger data are input into a model 28 of the elevator group, which contains the rules of behavior of the elevators and basic information, such as speed, car sizes, number of elevators, etc. The fundamental idea is that when input to the model, each passenger has an elevator assigned for him/her, and the elevator model works out the quality 30 of the solution alternative, e.g. in terms of passenger waiting time, riding time or traveling time or a combination of these. As the passenger allocation system knows individual passengers, the above-mentioned characteristics can be computed very accurately in the elevator model.

Thus, when taken to the elevator group model, each passenger has an elevator car assigned for him/her. For allocated passengers, the elevator has been definitely fixed and cannot be changed, whereas for unallocated passengers, the genetic algorithm suggests different alternative elevator cars and, working according to its principle, finds for each unallocated passenger an elevator car that will serve the passenger in the best possible way in terms of a quality value. An encoding unit 34 comprised in the genetic algorithm adds one gene for each unallocated passenger to the chromosome structure of the genetic algorithm. At the same time, it checks whether there are any service limitations 33 concerning the floors of departure and destination by checking the settings for locked states of landing and car calls and sending inquiries to the control units of different control functions. When adding a gene, the gene encoding unit 34 also fills in a code book 35, which tells the type of the gene. For example, there is a need to fix a direction for an elevator standing unoccupied at a floor. It is difficult to decide beforehand in which direction it would be more advantageous for the elevator to start out to serve the passengers allocated to it. This problem is solved by including in the chromosome, in the case of an idle elevator, a gene 36 representing direction and letting a genetic search establish which is the more advantageous starting direction for the elevator. A decoding unit 32, using the code book, reduces the chromosomes generated by the genetic algorithm during the genetic search into a form understood by the elevator model. Upon completion of the genetic search, an executive unit fetches the solution chromosome from the GA (genetic algorithm) kernel 38 and uses the decoding function. As a result, the decoding unit sets into the elevator data fields of the unallocated passengers the elevator cars indicated by the solution thus produced. Finally, for each unallocated passenger, the executive unit 39 sends an "allocated passenger" message as described in the previous paragraph. The position of the gene in the chromosome defines the identity of the passenger, and the value of the gene defines the elevator car assigned to serve the passenger. The direction genes for idle elevators may be encoded e.g. next to the passenger genes at the end of the chromosome. The sequence of the genes has in itself no importance because the code book describes the types and properties of the genes. Cars are not associated with elevators until in the elevator model.

FIG. 3 presents an example illustrating the generation of chromosomes and their genes in the passenger allocation procedure. The building used as an example in this figure has ten floors and four single-car elevators, the identifying numbers and directions of which are indicated above each hoistway. The positions of the elevators in the respective hoistways are as follows: elevator 1 is at the bottom floor 1, elevator is at floor 4, elevator 3 is at floor 7 and elevator 4 is at floor 10. The passengers and the destination floors given by them are shown to the right or to the left of the elevator group, depending on the traveling direction. Passengers having given a down call are depicted to the left of the elevator group. In the example, their number is four. A passenger having issued a call from the top floor 10 wants a ride to the bottom floor 1. From floor 8, two down calls have been entered, one or floor 5 and the other for floor 1. A passenger on floor 5 wants a ride to floor 1. In a corresponding manner, passengers with a destination in the up direction are depicted to the right of the elevator group. On floor 3, there is one passenger whose destination is floor 7. On floor 5, two passengers want a ride to floor 10, which is also the destination of a passenger on floor 8. The example includes both unallocated and allocated passengers. In the down direction, the passenger on floor 5 has been allocated to elevator 3. The other passengers are unallocated. Similarly, of the passengers having issued an up call, the passenger on floor 3 has been allocated to elevator 1 while the others are unallocated.

The leading principle in generating a chromosome is that each passenger having issued a call from a floor corresponds to a gene, and the value of the gene, i.e. allele, determines which elevator is to serve each individual passenger. Moreover, passengers waiting on the same floor and having the same destination can treated as a single gene, i.e. as a special passenger group gene. Just as the value of a gene representing a single passenger, i.e. a passenger gene, refers to the elevator car assigned to serve him/her, the value of a possible passenger group gene similarly indicates the elevator car to serve them. An example of a passenger group gene is seen at floor 5, where the passenger group gene contains two passengers who both have the same destination floor 10. A passenger group can be formed if on a floor there are passengers with the same destination.

In the example, the formation of the chromosome is presented below, the elevator group. The arrows starting from the passengers on different floors and from the passenger group on floor 5 point to the positions of the corresponding genes in the chromosome. In the chromosome, the passengers wanting a downward ride are arranged in a descending order by the floor of departure, placed before the passengers wanting an upward ride, who are arranged in an ascending order according to the floor of departure. Thus, the passenger on floor 10 is represented by the first gene in the chromosome, which is followed by the genes representing the passengers with downward destinations on floor 8. For these two passengers on floor 8, no group gene has been formed because they have different destinations. The fourth gene represents the passenger on floor 5 who wants a down-ride. The fifth gene is the upward-destined passenger on floor 3. The sixth gene is a passenger group gene combining the two passengers on floor 5 whose destination is floor 10 into a single gene. The passenger group gene is followed by a seventh gene, which represents the upward-destined passenger on floor 8. The order of the genes in relation to each other has in itself no importance because the position of the gene in the chromosome can be coded freely to individualize the gene.

The number of genes in FIG. 3 may vary from 5 to 8, depending on how the passengers in floor 5 who have the same destination are treated and on whether the allocated passengers are included in the chromosome structure. The two passengers on floor 5 who want a ride to floor 10 can be combined into a single passenger group gene, or alternatively each passenger can be treated independently, in which case the chromosome structure will contain a separate gene corresponding to each of the two passengers. Depending on the mode of treatment selected, there will be either one or two genes corresponding to them in the chromosome structure.

In the example presented in the figure, there are two passengers for whom an elevator car has been allocated during a previous round of allocation, but for the other passengers in this case suitable elevators have to be found. The passenger on floor 5 has been allocated to elevator 3.

Similarly, the passenger on floor 3 has been allocated to elevator 1. Therefore, the genes corresponding to these passengers have only one possible value, which in the case of the passenger on floor 5 means elevator 3 and in the case of the passenger on floor 3, elevator 1. Since no elevator car has been allocated for the other passengers, the genes corresponding to these have four potential elevator alternatives, i.e. elevators 1, 2, 3 and 4. An the elevators serving the passengers on floors 3 and 5 are known already and remain unchanged in the decision-making procedure, they need not necessarily be included in the final chromosome structure; instead, they can be taken directly to the elevator model as a part of the routes of the elevators concerned. This has the effect that these passengers on floors 3 and 5 are still taken into account in the decision-making procedure even if the genes in question are not included in the actual chromosome structure.

As the chromosome structure deals with elevator cars, the method is also applicable for use in elevator groups which may comprise single-car and/or multi-car elevators.

The invention is not restricted to the examples of its embodiments described above; instead, many variations are possible within the scope defined in the claims.

What is claimed is:

1. A method for allocating passengers in an elevator group having a plurality of elevator cars, in which a passenger gives a destination floor via a call device, the floors of departure and destination of the passenger being thus defined, such that the passenger is allocated to an elevator car to serve the passenger by a genetic allocation method, the method comprising the steps of:

encoding routes of the elevators cars into alternative chromosomes, wherein required data regarding the passenger and the elevator car is recorded in a gene in a chromosome;

utilizing genetic methods developing the alternative chromosomes and selecting the best chromosome;

directing the passengers indicated by the chromosome into the elevator cars represented by the chromosome; and directing the elevator cars indicated by the best chromosome to serve the passengers recorded in the chromosome.

2. The method as defined in claim 1, wherein the chromosome is so formed that the position of the gene in the chromosome defines an identity of the passenger, and a value of the gene defines the elevator car to serve the passenger.

3. The method as defined in claim 1, wherein the gene has multiple allele alternatives as long the genetic algorithm is in operation.

4. The method as defined in claim 1, wherein elevator cars fixed for passengers during previous rounds of allocation are recorded in the chromosome as genes whose allele is unchanged and represents a car already allocated for an allocated passenger.

5. The method as defined in claim 1, wherein the genetic allocation is performed in a GA kernel, from where an executive unit gets the elevator car selected for the passenger, which is taken to the elevator having this car as an allocated passenger.

6. The method as defined in claim 5, wherein, once the genetic algorithm has stopped, the executive unit calls a decoding function, whereupon the elevators corresponding to the best chromosome are obtained from the GA kernel and placed in the elevator data fields for unallocated passengers.

7. The method as defined in claim 1, wherein two or more passengers are treated together as a single passenger group gene.

8. An apparatus for allocating passengers belonging to an elevator group so that each passenger is served by one of the elevator cars in the elevator group, wherein the apparatus comprises:

an elevator model;

means for generating genes defining the passengers and the cars serving them;

a kernel of a genetic algorithm;

a coding unit, which coding unit fills in a code book and specifies the type of each gene and, by means of the code book, decodes the chromosomes generated by the kernel during a genetic search into a form understood by the elevator model; and means for serving the passengers in accordance with the genes selected.

9. The apparatus as defined in claim 8, further comprising an executive unit, which sends for each unallocated passenger an "allocated passenger" message to the elevator having the car to which the passenger has been allocated.

10. The apparatus as defined in claim 8 or 9, wherein the elevator car adds floors of departure and destination of the allocated passenger to its route as floors to stop at.

11. The apparatus as defined in claim 8, further comprising a statistics unit which compiles from individual passengers a traffic matrix for the building representing the traffic flow between each pair of floors, and which compiles statistics of a quality of passenger service, which is represented by passengers' waiting times, times spent onboard a car and traveling times.

* * * * *